United States Patent
Angel et al.

(10) Patent No.: US 12,195,272 B2
(45) Date of Patent: Jan. 14, 2025

(54) CAP FOR IMPELLER HUB OF TORQUE CONVERTER

(71) Applicant: Schaeffler Technologies AG & Co. KG, Herzogenaurach (DE)

(72) Inventors: Scott Angel, Marshallville, OH (US); Melissa Blischak, Copley, OH (US); Nigel Gurney, Wooster, OH (US)

(73) Assignee: Schaeffler Technologies AG &Co. KG, Herzogenaurach (DE)

( * ) Notice: Subject to any disclaimer, the term of this patent is extended or adjusted under 35 U.S.C. 154(b) by 83 days.

(21) Appl. No.: 17/876,605

(22) Filed: Jul. 29, 2022

(65) Prior Publication Data

US 2024/0034545 A1    Feb. 1, 2024

(51) Int. Cl.
*B65D 85/68* (2006.01)

(52) U.S. Cl.
CPC ...... *B65D 85/68* (2013.01); *B65D 2585/6882* (2013.01)

(58) Field of Classification Search
CPC .... B65D 2585/6882; B65D 2584/6882; B65D 85/68
See application file for complete search history.

(56) References Cited

U.S. PATENT DOCUMENTS

| | | | | |
|---|---|---|---|---|
| 2,717,728 A * | 9/1955 | Gray | | 215/354 |
| 6,032,829 A * | 3/2000 | Geisinger | | B65D 39/08 |
| | | | | 215/209 |
| 9,861,926 B2 * | 1/2018 | Lebon | | B01D 53/0407 |
| 10,807,773 B2 * | 10/2020 | Bois | | A61J 1/03 |
| 2019/0084401 A1 * | 3/2019 | Moasherziad | | F16H 57/00 |

FOREIGN PATENT DOCUMENTS

| | | | | |
|---|---|---|---|---|
| EP | 779066 A1 * | 6/1997 | | A61F 13/53 |
| FR | 1356814 A | 3/1964 | | |

* cited by examiner

*Primary Examiner* — Kenneth Bomberg
*Assistant Examiner* — Daniel S Collins

(57) ABSTRACT

A torque converter includes an impeller having an impeller shell and an impeller hub attached to a radially extending end of the impeller shell. The torque converter further includes a cap slidably engageable with the impeller hub. The cap includes a base and an inner ring portion. The inner ring portion is configured to be received by the impeller hub and includes an end spaced from the base. The end is configured to extend radially outside of an inner surface of the impeller hub in an installed position.

9 Claims, 3 Drawing Sheets

CAP FOR IMPELLER HUB OF TORQUE CONVERTER

TECHNICAL FIELD

The present disclosure relates generally to a torque converter, and more specifically to a cap for an impeller hub of a torque converter.

BACKGROUND

Often, a torque converter is filled with automatic transmission fluid (ATF) during shipping to prevent corrosion, reduce contamination within the torque converter, and balance the torque converter. It is a challenge to prevent ATF from dripping out of an impeller hub due to the orientation of the torque converter during shipping and/or due to manipulation of the torque converter during assembly to a vehicle.

SUMMARY

Embodiments disclosed herein provide a torque converter and a cap. The torque converter includes an impeller having an impeller shell and an impeller hub attached to a radially extending end of the impeller shell. The cap is slidably engageable with the impeller hub. The cap includes a base and an inner ring. The inner ring portion is configured to be received by the impeller hub and includes an end spaced from the base. The end is configured to extend radially outside of an inner surface of the impeller hub in an installed position.

In embodiments, the inner ring portion may include a rib disposed between the end and the base. The rib may be configured to retain the cap in the installed position. The rib may be disposed closer to the end than to the base.

In embodiments, the cap may include a pad surrounded by the inner ring portion and configured to absorb fluid. The inner ring portion may include a ledge disposed between the end and the base and extending radially inward from an inner surface of the inner ring portion. The ledge may be configured to retain the pad axially within the inner ring portion. The ledge may be disposed closer to the base than to the end.

In embodiments, the cap may include an outer ring portion disposed radially outside of the inner ring portion. The outer ring portion and the inner ring portion may define a channel therebetween. The channel may be configured to receive an axially extending end of the impeller hub in the installed position. An axial end of the outer ring portion may be disposed between the end of the inner ring portion and the base. The outer ring portion may be disposed radially inside of an outer surface of the base.

Embodiments of this disclosure further provide a cap for an impeller hub of a torque converter. The cap includes a base and an inner ring. The inner ring portion is configured to be received by the impeller hub and includes an end spaced from the base. The end is configured to extend radially outside of an inner surface of the impeller hub in an installed position.

In embodiments, the inner ring portion may include a rib disposed between the end and the base. The rib may be configured to retain the cap in the installed position. The rib may be disposed closer to the end than to the base.

In embodiments, the cap may include a pad surrounded by the inner ring portion and configured to absorb fluid. The inner ring portion may include a ledge disposed between the end and the base and extending radially inward from an inner surface of the inner ring portion. The ledge may be configured to retain the pad axially within the inner ring portion. The ledge may be disposed closer to the base than to the end.

In embodiments, the cap may include an outer ring portion disposed radially outside of the inner ring portion. The outer ring portion and the inner ring portion may define a channel therebetween. The channel may be configured to receive an axially extending end of the impeller hub in the installed position. An axial end of the outer ring portion may be disposed between the end of the inner ring portion and the base. The outer ring portion may be disposed radially inside of an outer surface of the base.

DETAILED DESCRIPTION

Embodiments of the present disclosure are described herein. It should be appreciated that like drawing numbers appearing in different drawing views identify identical, or functionally similar, structural elements. Also, it is to be understood that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The terminology used herein is for the purpose of describing particular aspects only and is not intended to limit the scope of the present disclosure. Unless defined otherwise, all technical and scientific terms used herein have the same meaning as commonly understood to one of ordinary skill in the art to which this disclosure belongs. Although any methods, devices or materials similar or equivalent to those described herein can be used in the practice or testing of the disclosure, the following example methods, devices, and materials are now described.

Typically, a torque converter is filled with ATF during shipping. The torque converter may be orientated, e.g., during shipping and/or during assembly to a vehicle, such that an impeller hub of the torque converter faces a ground surface. Therefore, even following an oil evacuation process, it is possible that residual ATF may drip from the impeller hub prior to installation of the torque converter to the automatic transmission. For example, ATF may remain on an inner surface of the impeller hub after removal of a shipping cap until the torque converter is moved from a shipping container, at which point forces required to move the torque converter may cause the ATF to drip from the inner surface of the impeller hub. If the shipping cap could direct ATF remaining on the inner surface of the impeller hub into the shipping cap, then a likelihood of ATF dripping from the impeller hub can be reduced. Embodiments according to the present disclosure provide a cap engageable with an impeller hub of a torque converter.

Figure 1:
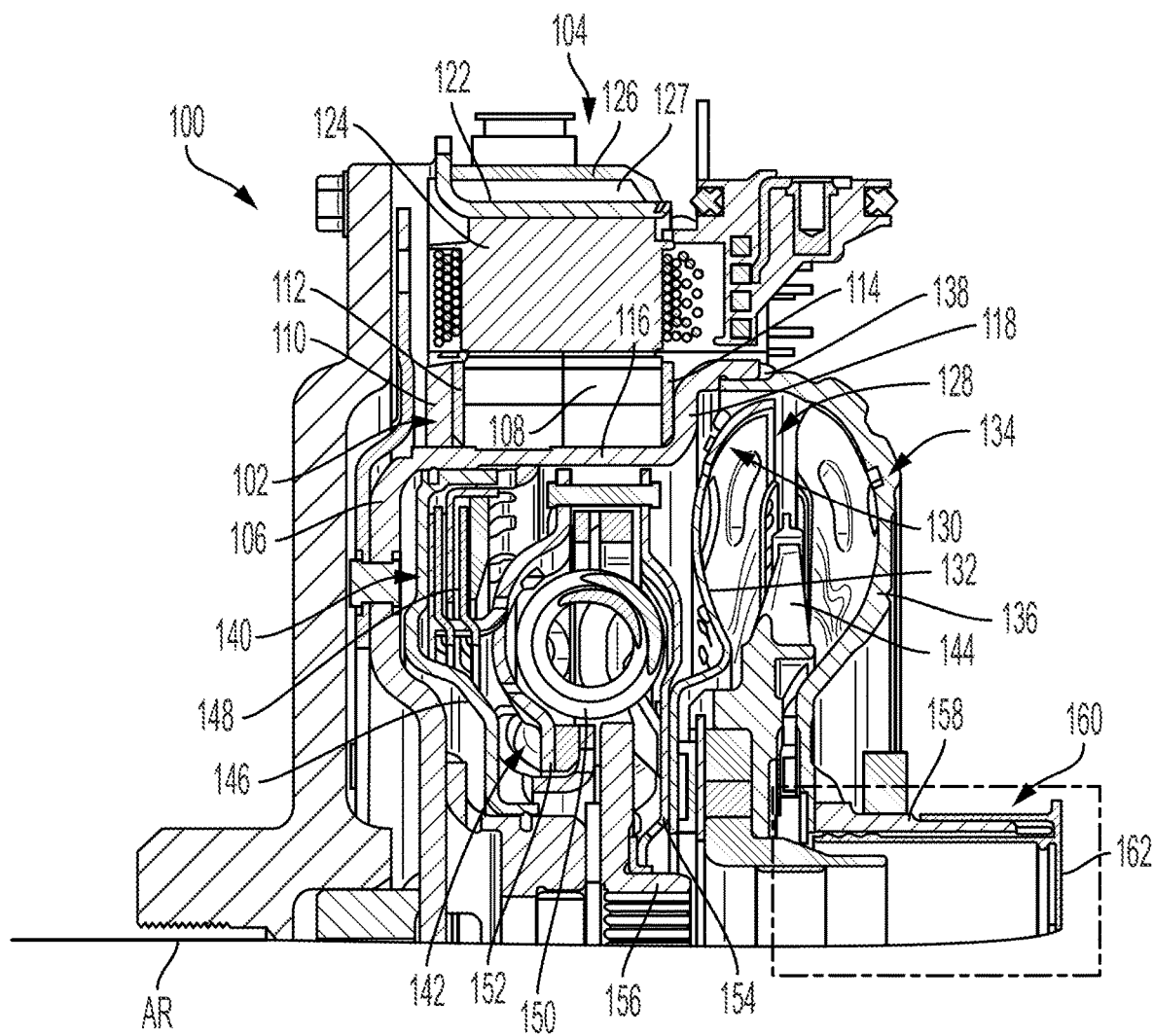
FIG. 1 shows a top half cross-sectional view of a hybrid module including a cap on an impeller hub according to an embodiment of the present disclosure.

FIG. 1 shows a top-half cross-sectional view of hybrid module 100 according to an embodiment of the present disclosure. Hybrid module 100 includes rotor assembly 102 and stator assembly 104 forming an e-motor assembly. Rotor assembly 102 includes rotor carrier 106, rotor segment 108, retaining ring 110, isolating ring 112, and isolating ring 114. Rotor carrier 106 includes axially extending portion 116 and radially extending portion 118. Rotor segment 108 is installed on an outer surface of axially extending portion 116 of rotor carrier 106. Rotor segment 108 may be a stack of segments, for example. Isolating rings 112, 114 are assembled on opposite axial sides of rotor segment 108. That is, isolating ring 112 is disposed axially between rotor segment 108 and retaining ring 110, and isolating ring 114 is disposed axially between rotor segment 108 and radially extending portion 118. Retaining ring 110 is configured to compress isolating rings 112, 114 to clamp and/or secure rotor segment 108 to rotor carrier 106 for frictional torque transmission between rotor segment 108 and the rotor carrier 106. Once the desired compression force is achieved, retaining ring 110 is fixed to the rotor carrier 106, e.g., by staking.

Stator assembly 104 is disposed radially outside of rotor assembly 102 and is fixed to bell housing (not shown) for a transmission. Stator assembly 104 includes stator carrier 122, stator segment 124, and water jacket 126. Stator segment 124 may be a stack of stator segments, for example and is mounted on an inner surface of stator carrier 122 by shrink fitting, for example. In other words, stator carrier 122 is heated to expand the inner surface and stator segment 124 is installed thereon. Once stator carrier 122 cools, the inner surface shrink fits to stator segment 124. Water jacket 126 is fixed to stator carrier 122 to enclose sealed chamber 127 therebetween.

Hybrid module 100 further includes torque converter 128 including turbine 130, turbine shell 132 having at least one blade attached thereto, impeller 134, and impeller shell 136 having at least one blade attached thereto. Impeller shell 136 is fixed to rotor carrier 106 at weld 138, for example. Impeller shell 136 and rotor carrier 106 form a housing, or enclosure, for torque converter 128. Lockup clutch 140, damper 142, and stator 144 are disposed within the housing formed by impeller shell 136 and rotor carrier 106. Lockup clutch 140 includes piston 146 and clutch plates 148 for torque transmission between rotor carrier 106 and damper 142. Damper 142 may include: springs 150, cover plates 152, 154 connected to each other radially outside springs 150, and output 156. Cover plate 152 may be connected to at least one of clutch plates 148 and cover plate 154 may be connected to turbine shell 132. That is, cover plates 152, 154 are arranged to act as an input to damper 142.

Torque converter 128 further includes impeller hub 158 connected to an inner end of impeller shell 136, for example, via welding. Impeller hub 158 extends in an axial direction away from impeller shell 136.

The torque converter 128 further includes a cap 160 slidably engaged with the impeller hub 158. The cap 160 is selectively slidable between an installed position, in which the cap 160 is arranged on and engaged with the impeller hub 158, and an uninstalled position, in which the cap 160 is spaced from the impeller hub 158. In the installed position, the cap 160 encloses the impeller hub 158. In the uninstalled position, the impeller hub 158 is open to an environment around the hybrid module 100. The cap 160 may be formed of any suitable material, e.g., plastic, rubber, etc. The cap 160 may be a single-piece construction, i.e., monolithic.

Figure 2:
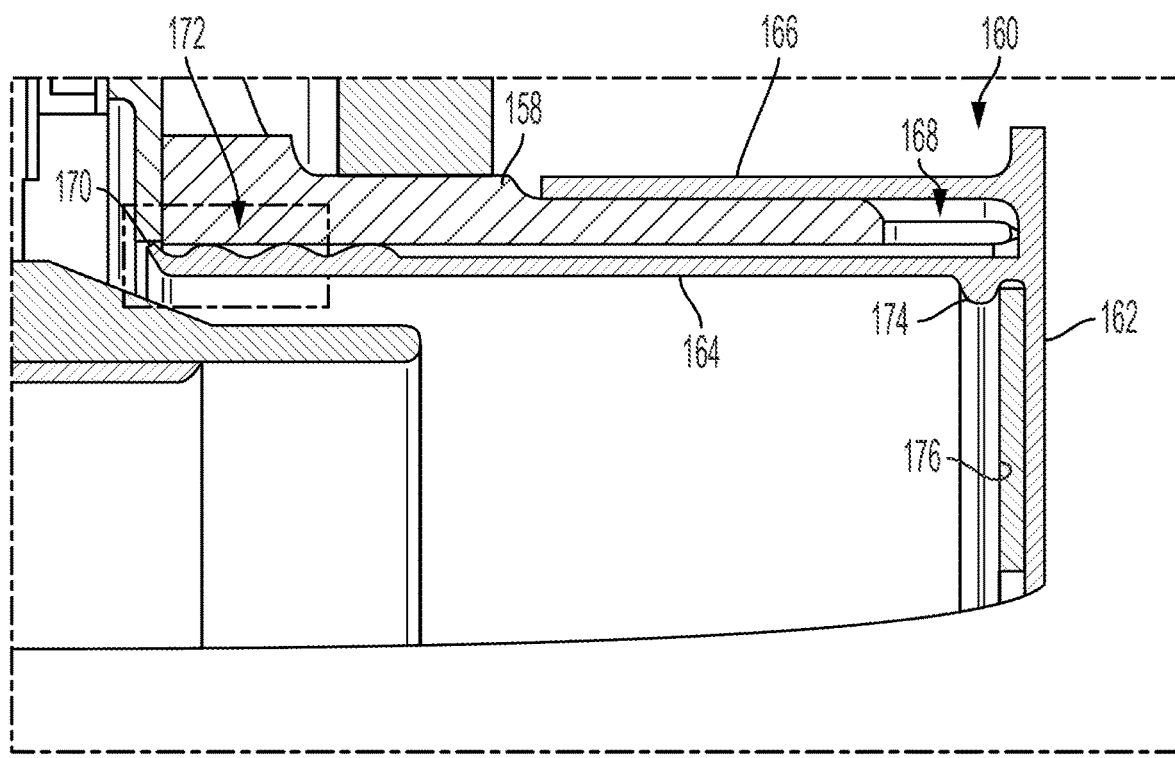
FIG. 2 shows an enlarged view of an area of the cap shown in FIG. 1.

Referring to FIG. 2, the cap 160 includes a base 162, an inner ring portion 164, and an outer ring portion 166 disposed radially outside of the inner ring portion 164. That is, the outer ring portion 166 may extend circumferentially about the inner ring portion 164. The outer ring portion 166 and the inner ring portion 164 define a channel 168 therebetween. The channel 168 extends radially from the inner ring portion 164 to the outer ring portion 166 and circumferentially about the axis of rotation AR. The channel 168 is configured to receive an axially extending end of the impeller hub 158 in the installed position.

The base 162 extends circumferentially about the axis of rotation AR. The base 162 extends radially outward of the impeller hub 158. That is, an outer surface of the base 162 is disposed radially outside of the impeller hub 158. The outer ring portion 166 is disposed radially inside of the outer surface of the base 162. The outer ring portion 166 is configured to engage an outer surface of the impeller hub 158.

The inner ring portion 164 extends annularly about the axis of rotation AR. The inner ring portion 164 is configured to engage an inner surface of the impeller hub 158. The inner ring portion 164 extends axially from the base 162 to an end 170 spaced from the base 162. The inner ring portion 164 may further include a ledge 174 extending radially inward from an inner surface of the inner ring portion 164. The ledge 174 may extend circumferentially about the axis of rotation AR. The ledge 174 may disposed between the end 170 and the base 162. The ledge 174 may be disposed closer to the base 162 than to the end 170. For example, the ledge 174 may be configured to axially retain a pad 176 within the inner ring portion 164.

The pad 176 may be surrounded by the inner ring portion 164. That is, the pad 176 may be disposed radially inside of the inner ring portion 164. The pad 176 may be disposed between the ledge 174 and the base 162. The pad 176 may extend radially outside of an inner surface of the ledge 174. The pad 176 may be formed of any suitable material capable of absorbing oil-based liquids such as ATF, or the like, e.g., cotton, polypropylene, etc. The pad 176 may extend annularly about the axis of rotation AR, e.g., to allow expansion of the pad 176 during absorption of the ATF.

Figure 3:
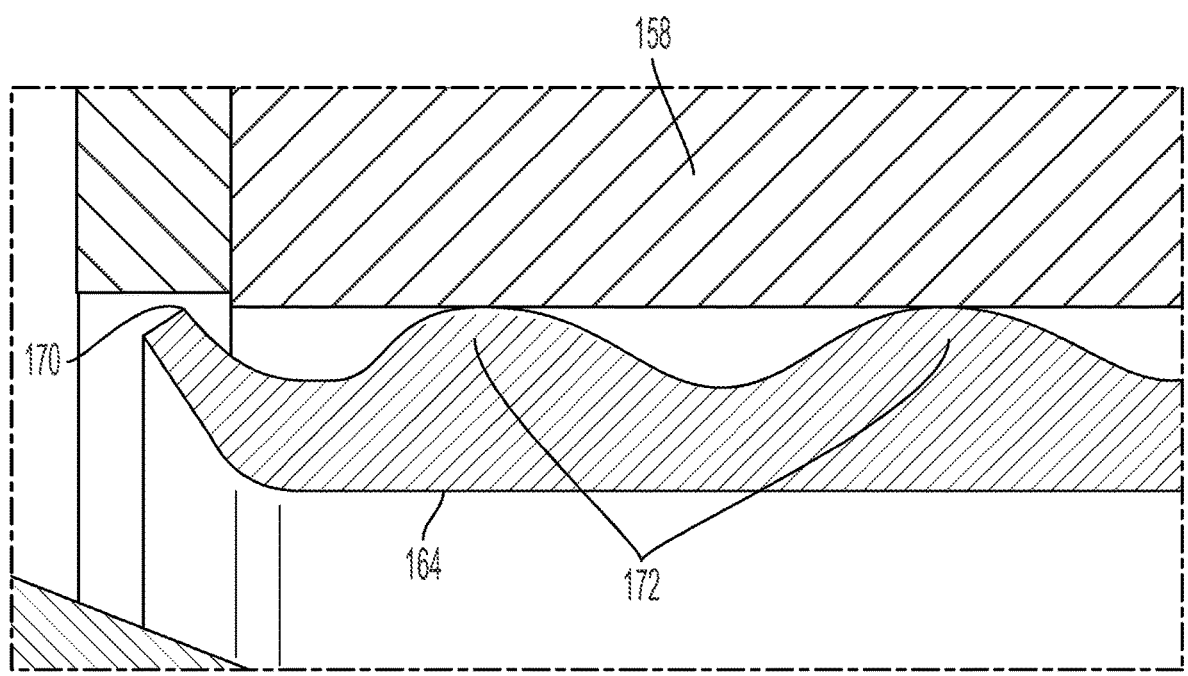
FIG. 3 shows an enlarged view of an area of the cap shown in FIG. 2.

Referring to FIG. 3, the inner ring portion 164 extends farther along the axis of rotation AR than the impeller hub 158. That is, an axial end of the impeller hub 158 is disposed between the end 170 of the inner ring portion 164 and the base 162 when the cap 160 is installed on the impeller hub 158. The end 170 of the inner ring portion 164 extends radially outside of an inner surface of the impeller hub 158 such that, during installation and removal, the end 170 presses against the inner surface of the impeller hub 158. By arranging the end 170 radially outside of the inner surface of the impeller hub 158, the end 170 can direct fluid, e.g., ATF, on the inner surface of the impeller hub 158 into the channel 168 when the cap 160 is removed from the impeller hub 158. Additionally, the end 170 can direct fluid towards the pad 176 when the cap 160 is installed on the impeller hub 158.

The inner ring portion 164 may further include one or more ribs 172 disposed axially between the end 170 and the base 162. The ribs 172 may be disposed closer to the end 170 than to the base 162. The ribs 172 may be configured to engage the inner surface of the impeller hub 158 to retain the cap 160 in the installed position. For example, an outer diameter of the inner ring portion 164 at the ribs 172 may be greater than an inner diameter of the impeller hub 158 such that the ribs 172 retain the cap 160 in the installed position via friction forces.

Embodiments disclosed herein provide a cap that is installed onto a torque converter impeller hub to collect AFT remaining in a typical hybrid module after shipping. By arranging an end of the cap radially outside of an inner surface of the impeller hub, the end can direct ATF onto a pad when the cap is installed on the impeller hub and can direct fluid off an inner surface of the impeller hub and into the cap during removal of the cap from the impeller hub. In this way, the cap can collect ATF, which can reduce a likelihood of ATF dripping onto a ground surface of an assembly station during assembly of the hybrid module to a transmission.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

LIST OF REFERENCE NUMBERS 100 hybrid module
102 rotor assembly
104 stator assembly
106 rotor carrier
108 rotor segment
110 retaining ring
112 isolating ring
114 isolating ring
116 axially extending portion
118 radially extending portion
122 stator carrier
124 stator segment
126 water jacket
127 sealed chamber
128 torque converter assembly
130 turbine
132 turbine shell
134 impeller
136 impeller shell
138 weld
140 lockup clutch
142 damper
144 stator
146 piston
148 clutch plates
150 springs
152 plate
154 plate
156 output
158 impeller hub
160 cap
162 base
164 inner ring portion
166 outer ring portion
168 channel
170 end
172 ribs
174 ledge
176 pad
AR axis of rotation

What is claimed is:

1. A torque converter, comprising:
an impeller having an impeller shell and an impeller hub attached to a radially extending end of the impeller shell; and
a cap slidably engageable with the impeller hub, the cap including:
a base;
an inner ring portion configured to be received by the impeller hub, the inner ring portion including an end spaced from the base; and
a pad surrounded by the inner ring portion and configured to absorb fluid;
wherein the end is configured to extend radially outside of an inner surface of the impeller hub in an installed position.

2. The torque converter of claim 1, wherein the inner ring portion includes a rib disposed between the end and the base, the rib being configured to retain the cap in the installed position.

3. The torque converter of claim 2, wherein the rib is disposed closer to the end than to the base.

4. The torque converter of claim 1, wherein the inner ring portion includes a ledge disposed between the end and the base and extending radially inward from an inner surface of the inner ring portion, the ledge being configured to retain the pad axially within the inner ring portion.

5. The torque converter of claim 4, wherein the ledge is disposed closer to the base than to the end.

6. The torque converter of claim 1, wherein the cap includes an outer ring portion disposed radially outside of the inner ring portion, the outer ring portion and the inner ring portion defining a channel therebetween.

7. The torque converter of claim 6, wherein the channel is configured to receive an axially extending end of the impeller hub in the installed position.

8. The torque converter of claim 6, wherein an axial end of the outer ring portion is disposed between the end of the inner ring portion and the base.

9. The torque converter of claim 6, wherein the outer ring portion is disposed radially inside of an outer surface of the base.

* * * * *